May 3, 1949.  J. S. NEWTON  2,469,238
GAS TURBINE APPARATUS
Filed Aug. 28, 1947

WITNESSES:
V. W. Novak
E. H. Lutz

INVENTOR
JOHN S. NEWTON
BY
ATTORNEY

Patented May 3, 1949

2,469,238

UNITED STATES PATENT OFFICE 2,469,238

GAS TURBINE APPARATUS

John S. Newton, Havertown, Pa., assignor to Westinghouse Electric Corporation, East Pittsburgh, Pa., a corporation of Pennsylvania Application August 28, 1947, Serial No. 771,108

3 Claims. (Cl. 60—102)

The invention relates to propulsion gas turbine plants and it has for its object to provide forward and reversing turbines rotating in opposite directions, driving compressors, and either of which is clutched to propulsion means, together with means providing for flow of air from the atmosphere through the compressors in series to the combustor and for flow of motive fluid from the latter first through the forward turbine and then through the reversing turbine before exhausting to the atmosphere.

In a propulsion gas turbine plant, to meet speed and power requirements, there is advantage in providing an auxilary turbo-compressor operable at a speed suitable to the power requirements and independently of the propulsion speed. As propulsion involves forward and reversing travel, I provide forward and reversing turbines, each driving a compressor, clutches for connecting either turbine to propulsion mechanism, means providing for flow of air from the atmosphere in series through the compressors to the combustor and for flow of motive fluid from the latter first through the forward turbine and then through the reversing turbine before exhausting to the atmosphere. Thus it will be seen that both turbines operate whenever the plant is in operation and that the unclutched turbine is capable of operating independently of propulsion speed in meeting power requirements. Preferably, the forward turbine is designed to drive its compressor and deliver ahead power so as to avoid, when unclutched, operation at destructive speeds.

Figure 1:
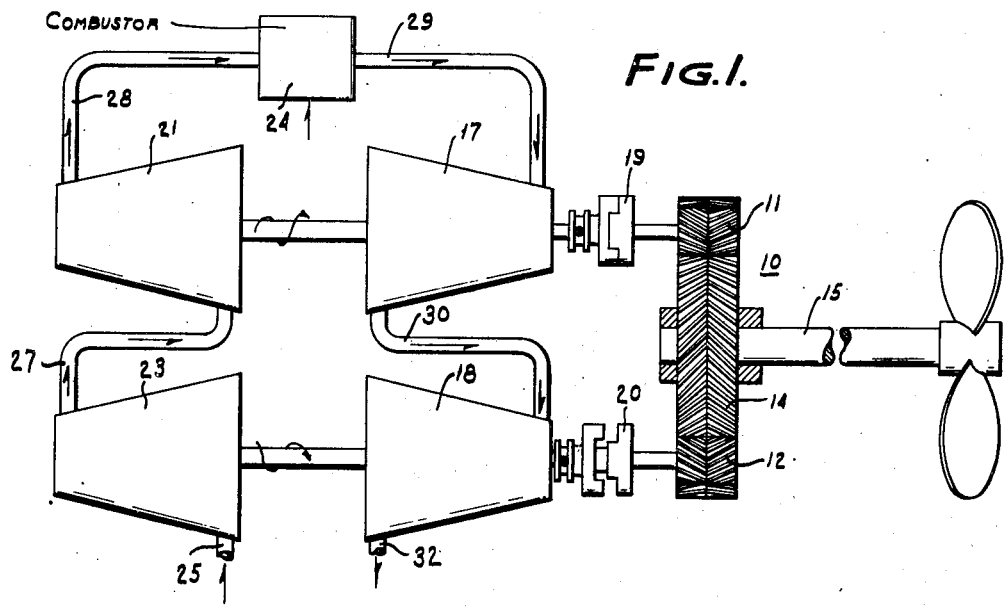
Figure 2:
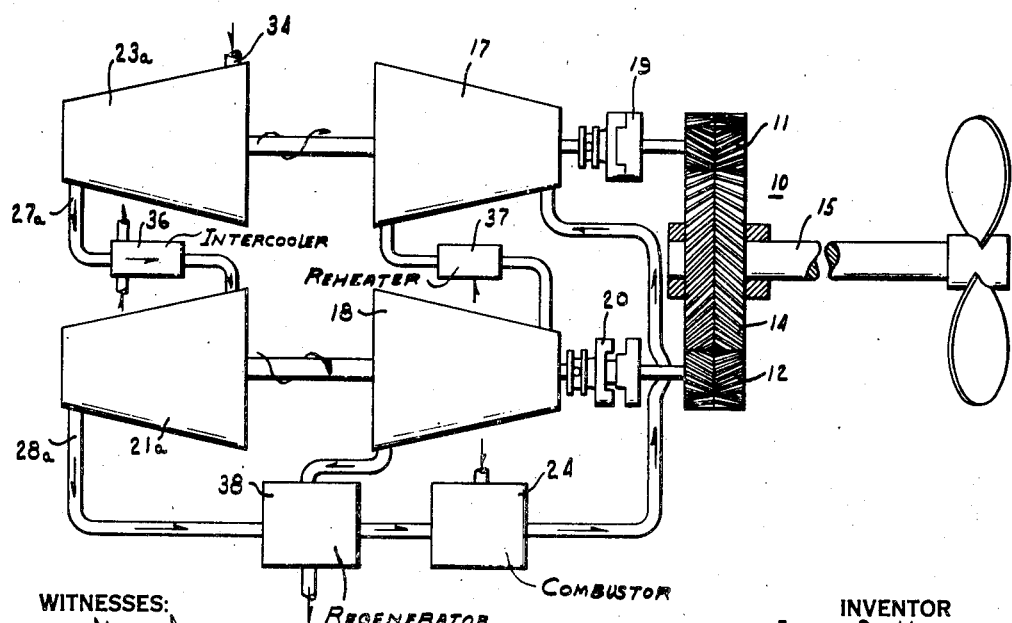

The foregoing and other objects are affected by the invention as will be apparent from the following description and claims taken in connection with the accompanying drawing, forming a part of this application, in which:

Figure 1 is a diagrammatic view showing one form of the improved propulsion power plant; and Figure 2 is a view similar to Figure 1 but showing a modified arrangement.

In the drawing, there is shown propulsion mechanism, at 10, including pinions 11 and 12 meshing with the driven gear 14 connected to the propeller shaft 15.

Forward and reversing gas turbines 17 and 18 are connected by clutches 19 and 20 to the pinions 11 and 12 and they drive the compressors 21 and 23, respectively.

Air from the atmosphere flows in series through the compressors to the combustor 24 to support combustion of fuel supplied to the latter and to admix with the resulting products of combustion to form motive fluid, which flows first through the forward turbine 17 and then through the reversing turbine 18 before exhausting to the atmosphere.

In Figure 1, air from the atmosphere enters the inlet 25 to compressor 23 driven by the reversing turbine, and flows in series through such compressor, the conduit 27, the compressor 21, and the conduit 28 to the combustor 24 to support combustion of fuel supplied to the latter and to admix with the resulting products of combustion to form motive fluid. Motive fluid leaving the combustor is supplied by the conduit 29 to the inlet of the forward turbine 17 and flows in series through the latter, the conduit 30, and the reversing turbine 18 before exhausting through the outlet 32 to the atmosphere.

Figure 2 differs from Figure 1 in respect to the flow of air through the compressors to the combustor, air entering from the atmosphere through the inlet 34 to the compressor 23a and flowing in series through the latter, the conduit 27a, the compressor 21a and the conduit 28a to the combustor 24, motive fluid from the latter flowing through the turbines in the manner already described.

Where the propulsion plant is used for propelling a ship, as diagrammatically illustrated, the forward turbine and compressor may operate at a speed of around 5,000 R. P. M., while the reversing turbine operates at a speed of around 3,000 R. P. M., pinions of suitable size being selected for driving the driven gear. The clutches 19 and 20 may be of any suitable type, electric mechanical or hydraulic. The arrangement of the plant described lends itself well to the accommodation of gas turbine power plant adjuncts, such as intercoolers, reheating and regenerating devices; for example, in Figure 2, there is shown an intercooler 36 incorporated in the conduit 27a between the compressors and there is shown a fuel-heated reheating apparatus 37 in the connection between the turbines. This view also shows a regenerator 38 for transferring heat from the motive fluid exhausting from the reversing turbine to air entering the combustor 24.

Considering now the operation and operative relationship of the structure described, with connection of either clutch and disconnection of the other, the disconnected turbine still remains effective to contribute to the development of propulsive power, either ahead or astern, by driving one of the compressors. The turbines and compressors are designed and arranged so that, with the clutch 19 connected and the clutch 20 disconnected, the ahead turbine 17 will normally drive the compressor to which it is connected, the astern turbine 18 assisting in power development by carrying the load of the other stage of compressor, and with disconnection of the clutch 19, the clutch 20 remaining disconnected, the speed will increase but not to a destructive value. The speed of the astern turbine 18 and its gear ratio is selected to give the required astern power and torque.

While the invention has been shown in several forms, it will be obvious to those skilled in the art that it is not so limited, but is susceptible of various other changes and modifications without departing from the spirit thereof.

What is claimed is:

1. In a propulsion power plant, a rotatable propulsion mechanism, forward and reversing turbines rotatable in opposite directions, clutches for connecting either turbine to the propulsion mechanism, compressors driven by the turbines, a combustor supplied with fuel, means for conducting air from the atmosphere through the compressors in series to the combustor to support combustion of fuel therein and to admix with the resulting products of combustion to form motive fluid, and means for conducting motive fluid from the combustor first through the forward turbine and then through the reversing turbine before exhausting from the latter to the atmosphere.

2. Apparatus as claimed in claim 1 wherein atmospheric air enters the compressor driven by the reversing turbine and flows therethrough and then through the compressor driven by the forward turbine.

3. Apparatus as claimed in claim 1 wherein atmospheric air enters the compressor driven by the forward turbine and flows therethrough and then through the compressor driven by the reversing turbine.

JOHN S. NEWTON.

No references cited.